United States Patent
Xu et al.

(10) Patent No.: US 9,759,301 B2
(45) Date of Patent: Sep. 12, 2017

(54) CLAMPING APPARATUS

(71) Applicants: FU DING ELECTRONICAL TECHNOLOGY (JIASHAN) CO., LTD., Zhejiang (CN); HON HAI PRECISION INDUSTRY CO., LTD., New Taipei (TW)

(72) Inventors: Jun-Feng Xu, Jiashan (CN); Ren-Jie Jiang, Jiashan (CN); Li-Ping Guo, Jiashan (CN)

(73) Assignees: FU DING ELECTRONICAL TECHNOLOGY (JIASHAN) CO., LTD., Jiashan (CN); HON HAI PRECISION INDUSTRY CO., LTD., New Taipei (TW)

( * ) Notice: Subject to any disclaimer, the term of this patent is extended or adjusted under 35 U.S.C. 154(b) by 624 days.

(21) Appl. No.: 14/473,450

(22) Filed: Aug. 29, 2014

(65) Prior Publication Data
US 2015/0059502 A1    Mar. 5, 2015

(30) Foreign Application Priority Data
Sep. 5, 2013   (CN) .................. 2013 2 05499515 U

(51) Int. Cl.
| B25B 1/00 | (2006.01) |
| F16H 37/12 | (2006.01) |
| B23B 31/40 | (2006.01) |
| B23B 31/42 | (2006.01) |

(52) U.S. Cl.
CPC ........... *F16H 37/124* (2013.01); *B23B 31/40* (2013.01); *B23B 31/42* (2013.01); *Y10T 74/18576* (2015.01)

(58) Field of Classification Search
CPC    B25B 1/08; B25B 1/10; B25B 1/2452; B25B 5/02; B25B 5/08; B25B 5/163; B25B 11/0007
See application file for complete search history.

(56) References Cited

U.S. PATENT DOCUMENTS

| 6,790,134 B2 * | 9/2004 | Swaddle ................. B24B 23/06 451/355 |
| 7,083,508 B2 * | 8/2006 | Swaddle ................. B24B 23/06 451/344 |
| 7,617,558 B2 * | 11/2009 | Boe ......................... B08B 9/049 15/104.061 |
| 2015/0059502 A1 * | 3/2015 | Xu ........................... B23B 31/40 74/89.23 |

* cited by examiner

*Primary Examiner* — Lee D Wilson
(74) *Attorney, Agent, or Firm* — Steven Reiss

(57) ABSTRACT

A clamping apparatus includes a main shaft, at least two pushing members, a follow member movably sleeved on the main shaft, a coupling member fixedly sleeved on the main shaft, at least two first linkages respectively pivoted to the follow member, at least two second linkages, and a nut. Each of the at least two second linkage is pivoted to the corresponding first linkage, the coupling member, and the corresponding pushing member. The nut is movably sleeved on the main shaft and positioned at a side of the follow member away from the coupling member. The nut is configured to move the follow member towards the coupling member, to enable the at least two pushing members to move away from the main shaft.

20 Claims, 5 Drawing Sheets

CLAMPING APPARATUS

FIELD

The subject matter herein generally relates to clamping apparatuses, and particularly to a clamping apparatus configured to clamp a cylindrically shaped workpiece.

BACKGROUND

When a workpiece is transferred or fed, a clamping apparatus can be used to clamp the workpiece. The clamping apparatus can clamp an outer side surface of the workpiece to hold the workpiece. However, it is easily to deform the workpiece, especially when a shape of the workpiece is cylindrical.

BRIEF DESCRIPTION OF THE DRAWINGS

Implementations of the present technology will now be described, by way of example only, with reference to the attached figures.

DETAILED DESCRIPTION

Figure 1:
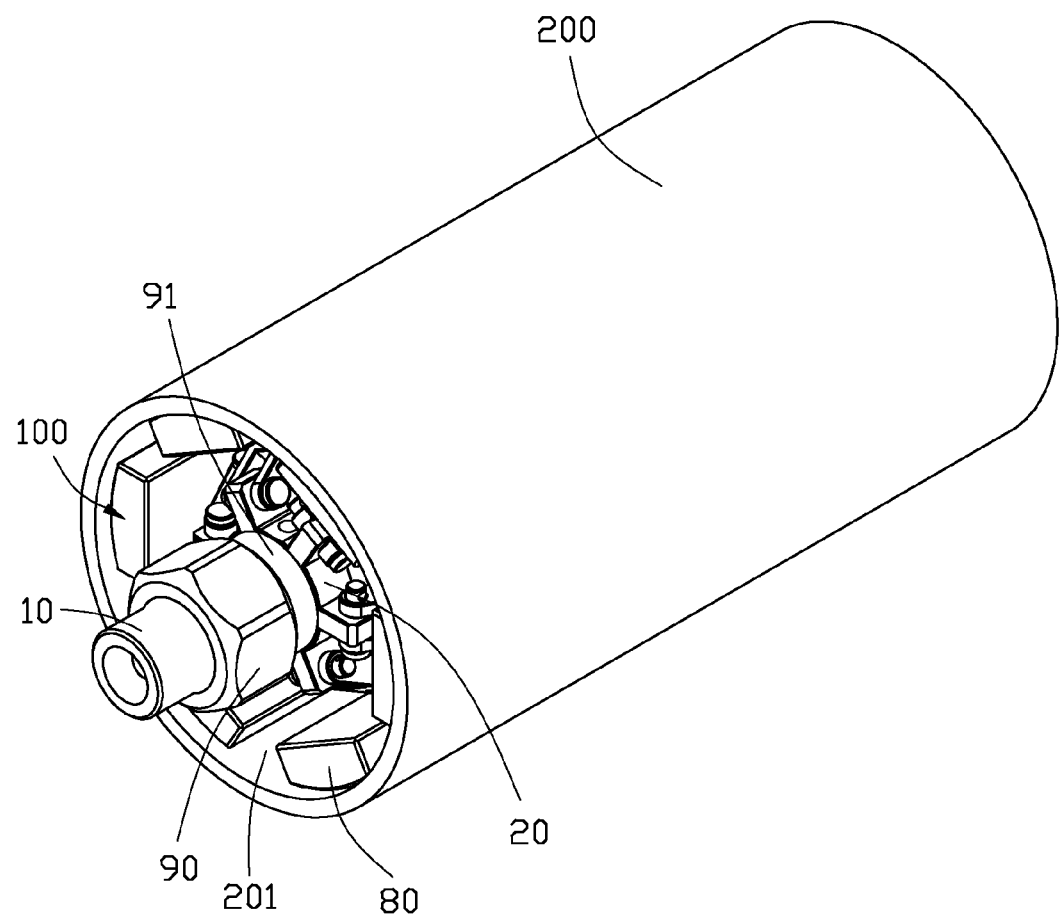
FIG. 1 is an isometric view of an embodiment of a clamping apparatus holding a workpiece.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure relates to a clamping apparatus having, in one embodiment, a main shaft, at least two pushing members, a follow member movably sleeved on the main shaft, a coupling member fixedly sleeved on the main shaft, at least two first linkages respectively pivoted to the follow member, at least two second linkages, and a nut. Each of the at least two second linkages can be pivoted to the corresponding first linkage, the coupling member, and the corresponding pushing member. The nut can be movably sleeved on the main shaft and positioned at a side of the follow member away from the coupling member. The nut can be configured to move the follow member towards the coupling member, to enable the at least two pushing members to move away from the main shaft.

The present disclosure further relates to a clamping apparatus that can include a main shaft, two pushing members, a follow member movably sleeved on the main shaft, two coupling members, two first linkages, four second linkages, and a nut. The coupling members can be fixedly sleeved on the main shaft. The first linkages can be respectively pivoted to the follow member. Two of the four second linkages can be respectively pivoted to the first linkages, the coupling member adjacent to the follow member, and the pushing members. Another two of the four second linkages can be respectively pivoted to the coupling member away from the follow member and the pushing members. The nut can be movably sleeved on the main shaft and positioned at a side of the follow member away from the coupling members. The nut can be configured to move the follow member towards the adjacent coupling member, to enable the at least two pushing members to move away from the main shaft.

FIG. 1 illustrates an embodiment of a clamping apparatus 100 configured to clamp or hold a workpiece 200 in a shape of cylindrical. The workpiece 200 can define a through hole 201.

Figure 2:
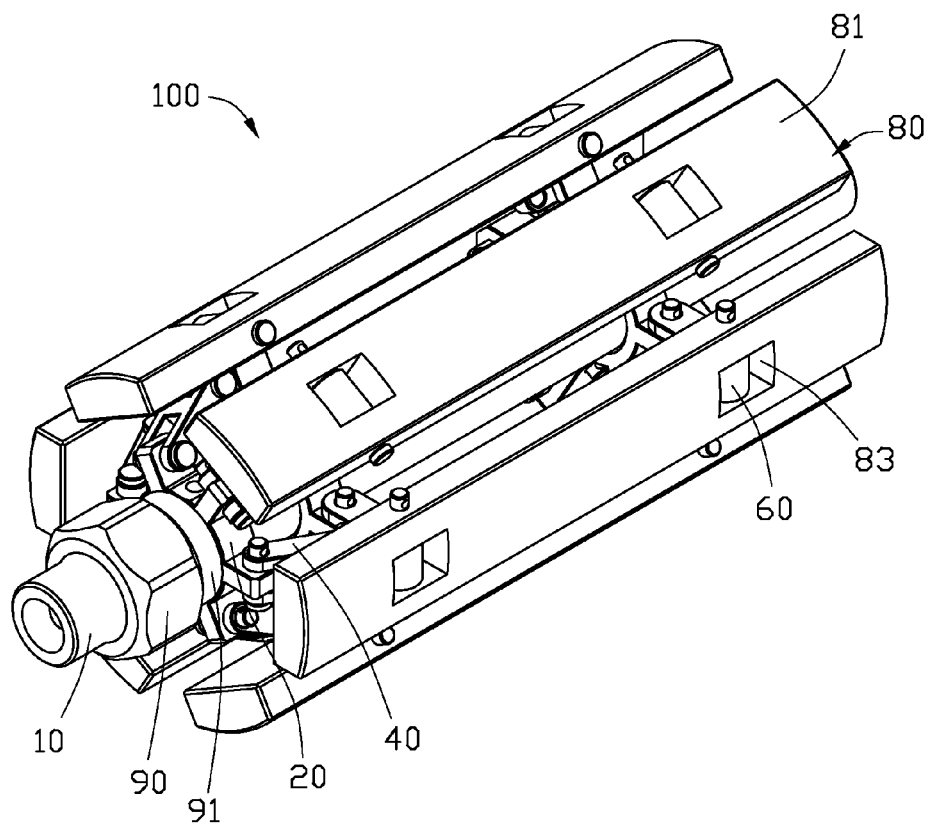
FIG. 2 is an isometric view of the clamping apparatus of FIG. 1.
Figure 3:
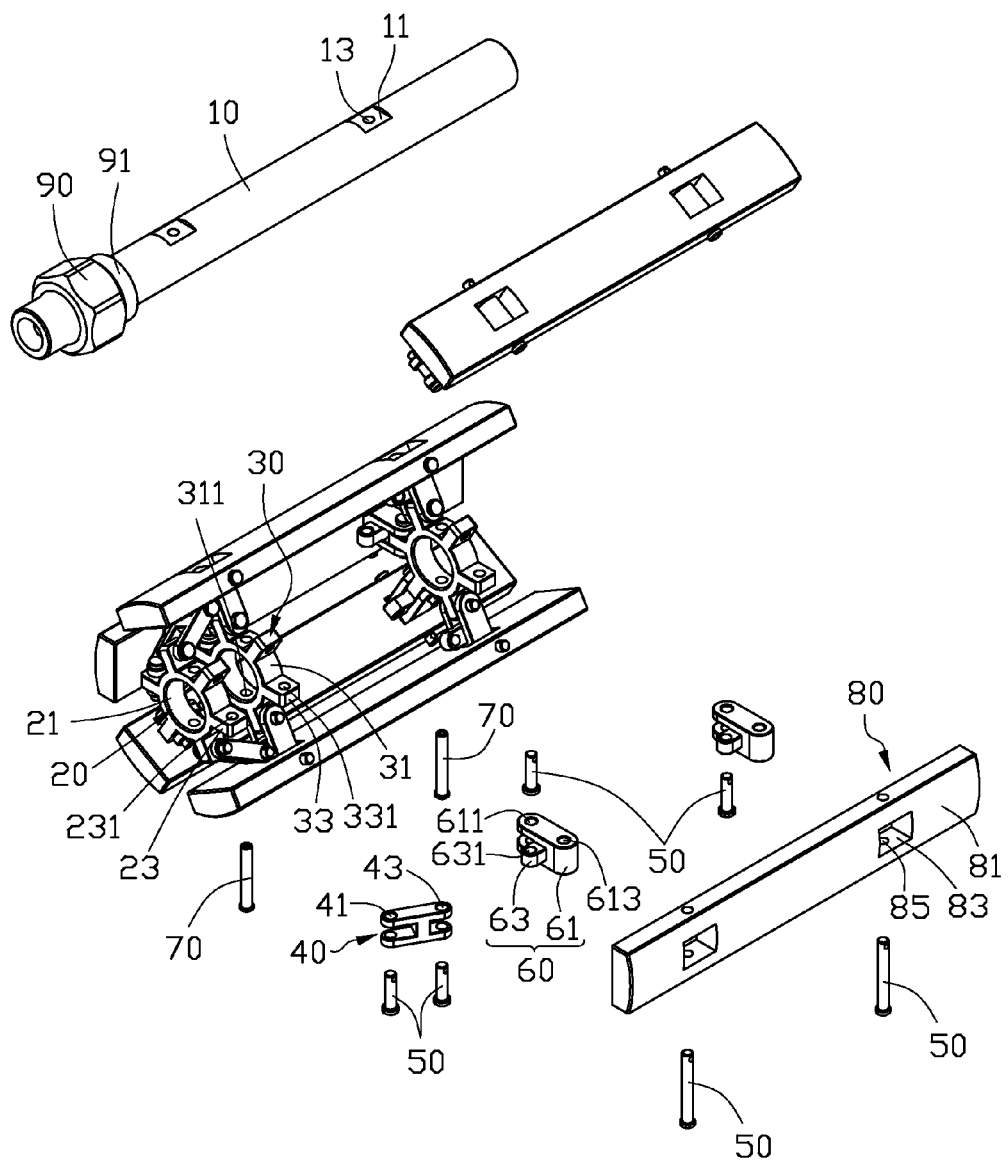
FIG. 3 is an exploded, isometric view of the clamping apparatus of FIG. 1.

FIGS. 2 and 3 illustrate that the clamping apparatus 100 can include a main shaft 10, a follow member 20, at least one coupling member 30, at least two first linkages 40, a plurality of pivoting pins 50, at least two second linkages 60, at least one coupling pin 70, at least two pushing members 80, a nut 90, and an elastic member 91. The follow member 20 can be rotatably sleeved on the main shaft 10. The at least one coupling member 30 can be fixedly sleeved on the main shaft 10 and fixed to the main shaft 10 via the at least one coupling pin 70.

The at least two first linkages 40 can be symmetrically positioned at opposite sides of the main shaft 10 and respectively pivoted to the follow member 20 via the corresponding pivoting pin 50. The at least two second linkages 60 can be symmetrically positioned at opposite sides of the main shaft 10 and respectively pivoted to the at least one coupling member 30 via the corresponding pivoting pin 50. The at least two second linkages 60 can correspond to the at least two first linkages 40. Each first linkage 40 can be pivoted to the corresponding second linkage 60 via one of the pivoting pins 50. The at least two pushing members 80 can be symmetrically positioned at opposite sides of the main shaft 10 and respectively pivoted to the at least two second linkage 60 via the corresponding pivoting pin 50. The nut 90 can be movably sleeved on the main shaft 10 and positioned at a side of the follow member 20 away from the at least one coupling member 30. The elastic member 91 can be sleeved on the main shaft 10 and positioned between the nut 90 and the follow member 20. When the nut 90 is driven to move along the main shaft 10, the at least two pushing members 80 can move away from each other along a radial direction of the main shaft 10 to hold the workpiece 200.

In the illustrated embodiment, a number of the coupling member 30 can be two. A number of the coupling pin 70 can be two. A number of the first linkage 40 can be six. A number of the pushing member 80 can be six corresponding to a number of the first linkage 40. A number of the second linkage 60 can be twelve and six second linkages 60 thereof can be corresponding to the six first linkages 40. A number of the pivoting pins 50 can be thirty-six.

The main shaft 10 can be substantially cylindrical and define two pairs of limiting grooves 11 at an outer side surface. Each pair of limiting grooves 11 can be symmetrically positioned opposite sides of the main shaft 10. The main shaft 10 can further define two fixing holes 13 respectively running through the main shaft 10 along the radial direction of the main shaft 10. Each fixing hole 13 can communicate with the corresponding pair of limiting grooves 11.

The follow member 20 can include a mounting portion 21 and six pivoting portions 23 fixedly coupled to the mounting portion 21. The mounting portion 21 can be substantially in a shape of a ring. The mounting portion 21 can be movably sleeved on a portion of the main shaft 10 adjacent one pair of limiting grooves 11 and positioned at a side of the pair of limiting grooves 11 away from another pair of limiting grooves 11. The pivoting portions 23 can be evenly spaced around the mounting portion 21. Each two pivoting portions 23 can be symmetrically positioned opposite sides of the mounting portion 21. Each pivoting portion 23 can define a pivoting hole 231. In at least one embodiment, a number of the pivoting portions 23 can be two or more than two.

The coupling members 30 can be spacedly sleeved on the main shaft 10 and respectively received in the corresponding pair of limiting grooves 11. A structure of each coupling member 30 can be similar to that of the follow member 20. Each coupling member 30 can include a mounting portion 31 and six pivoting portions 33 fixedly coupled to the mounting portion 31. The mounting portion 31 can be substantially in a shape of a ring and sleeved on the main shaft 10. The mounting portion 31 can define a coupling hole 311 along a radial direction thereof. The pivoting portions 33 can be evenly spaced around the mounting portion 31. Each two pivoting portions 33 can be symmetrically positioned opposite sides of the mounting portion 31. Each pivoting portion 33 can define a pivoting hole 331. The coupling member 30 can be fixed to the main shaft 10 via the corresponding coupling pin 70 inserted into the coupling hole 311 and the fixing hole 13. In at least one embodiment, a number of the pivoting portions 33 can be two or more than two.

The first linkages 40 can be respectively pivoted to the pivoting portions 23 of the follow member 20 via six of the pivoting pins 50. Each first linkage 40 can be substantially H-shaped. Opposite end portions of each first linkage 40 can be respectively pivoted to the corresponding second linkage 60 and the corresponding pivot portion 23 via the pivoting pins 50. Each first linkage 40 can define a first pivoting hole 41 and a second pivoting hole 43 at the opposite end portions thereof. Each first linkage 40 can be pivoted to the corresponding pivoting portion 23 of the follow member 20 via one pivoting pin 50 inserted into the first pivoting hole 41 and the pivoting hole 231 of the corresponding pivoting portion 23.

Six of the twelve second linkages 60 in this example can be pivoted to the six pivoting portions 33 of the corresponding coupling member 30 and the six first linkages 40. Another six of the twelve second linkages 60 can be pivoted to another coupling member 30. Each second linkage 60 can include a first pivoting portion 61 and a second pivoting portion 63 extending from a substantially middle portion of the first pivoting portion 61. The second pivoting portion 63 can be substantially perpendicular to the first pivoting portion 61. Opposite end portions of the first pivoting portion 61 can be respectively pivoted to the corresponding coupling member 30 and the corresponding pushing member 80. The second pivoting portion 63 can be pivoted to the first linkage 40. The first pivoting portion 61 can define a third pivoting hole 611 and a fourth pivoting hole 613 at the opposite end portions thereof. The second pivoting portion 63 can define a pivoting hole 631.

Six pivoting pins 50 can be respectively inserted into the third pivoting holes 611 of the six second linkage 60 and the pivoting holes 331 of the corresponding coupling member 30, thereby coupling the six second linkage 60 with the corresponding coupling member 30. Another six pivoting pins 50 can be respectively inserted into the pivoting holes 631 and the second pivoting holes 43 of the first linkages 40, thereby coupling the six first linkages 40 with the six second linkages 60. Another six pivoting pins 50 can be inserted to the third pivoting holes 631 of another six second linkages 60 and the pivoting holes 331 of another coupling member 30.

The pushing member 80 can be substantially in a shape of a stripe. Each pushing member 80 can include an outer surface 81. The outer surface 81 can be in a shape of a cylindrical surface, such as the interior cylindrical surface of the hole 201 of the workpiece 200. The pushing member 80 can define two openings 83 arranged apart and two pairs of positioning holes 85. Each pair of positioning holes 85 can be defined along a lateral direction of the pushing member 80 and communicating with the corresponding opening 83. Each positioning holes 85 can be positioned at opposite sides of the corresponding opening 83.

One of the pivoting pins 50 can be inserted into the corresponding pair of positioning holes 85 and the fourth pivoting hole 613 of the corresponding second linkage 60, thereby the pushing member 80 being pivoted to the corresponding second linkage 60. Each pushing member 80 can be pivoted to two of the second linkages 60 which respectively pivot to the coupling members 30. The six pushing members 80 can be arranged around the main shaft 10. Each two of the pushing members 80 can be symmetrical relative to the main shaft 10. The six pushing members 80 can be arranged so they collectively form a ring. The outer surfaces 81 of the pushing members 80 can cooperatively form an outer surface of a column.

The nut 90 can be threaded with the main shaft 10 and positioned at a side of the follow member 20 away from the coupling members 30. The elastic member 91 can be sleeved on the main shaft 10 and positioned between the nut 90 and the follow member 20. The elastic member 91 can be substantially in a shape of a ring and made of flexible materials. The elastic member 91 can be configured and/or shaped to prevent the nut 90 from striking the follow member 20. One or more elastic members 91 can be used.

In assembly, the coupling members 30 can be fixed to the main shaft 10. The follow member 20, the elastic member 91, and the nut 90 can be sleeved on the main shaft 10 one by one. The first linkages 40 can be pivoted to the follow member 20. The second linkages 60 can be pivoted to the corresponding first linkages 40 and the coupling members 30, and further pivoted to the pushing members 80.

Figure 4:
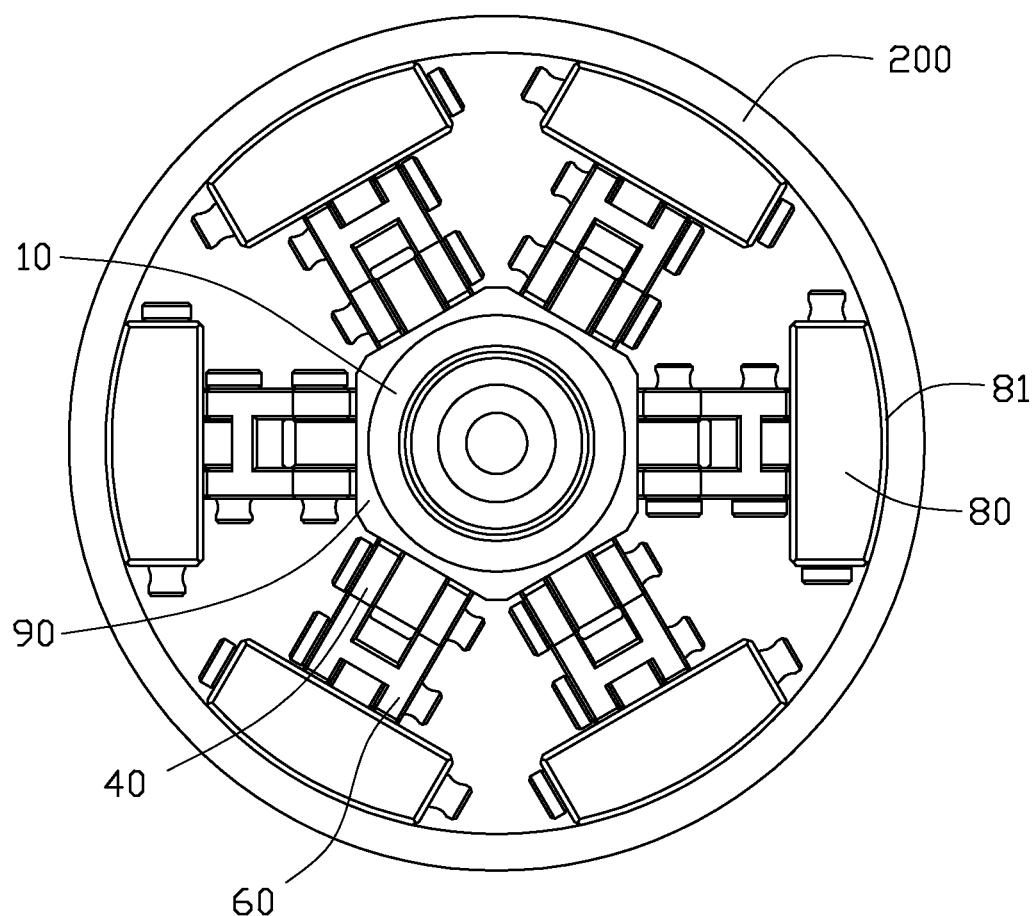
FIG. 4 is a side view of the clamping apparatus of FIG. 1 with the workpiece.
Figure 5:
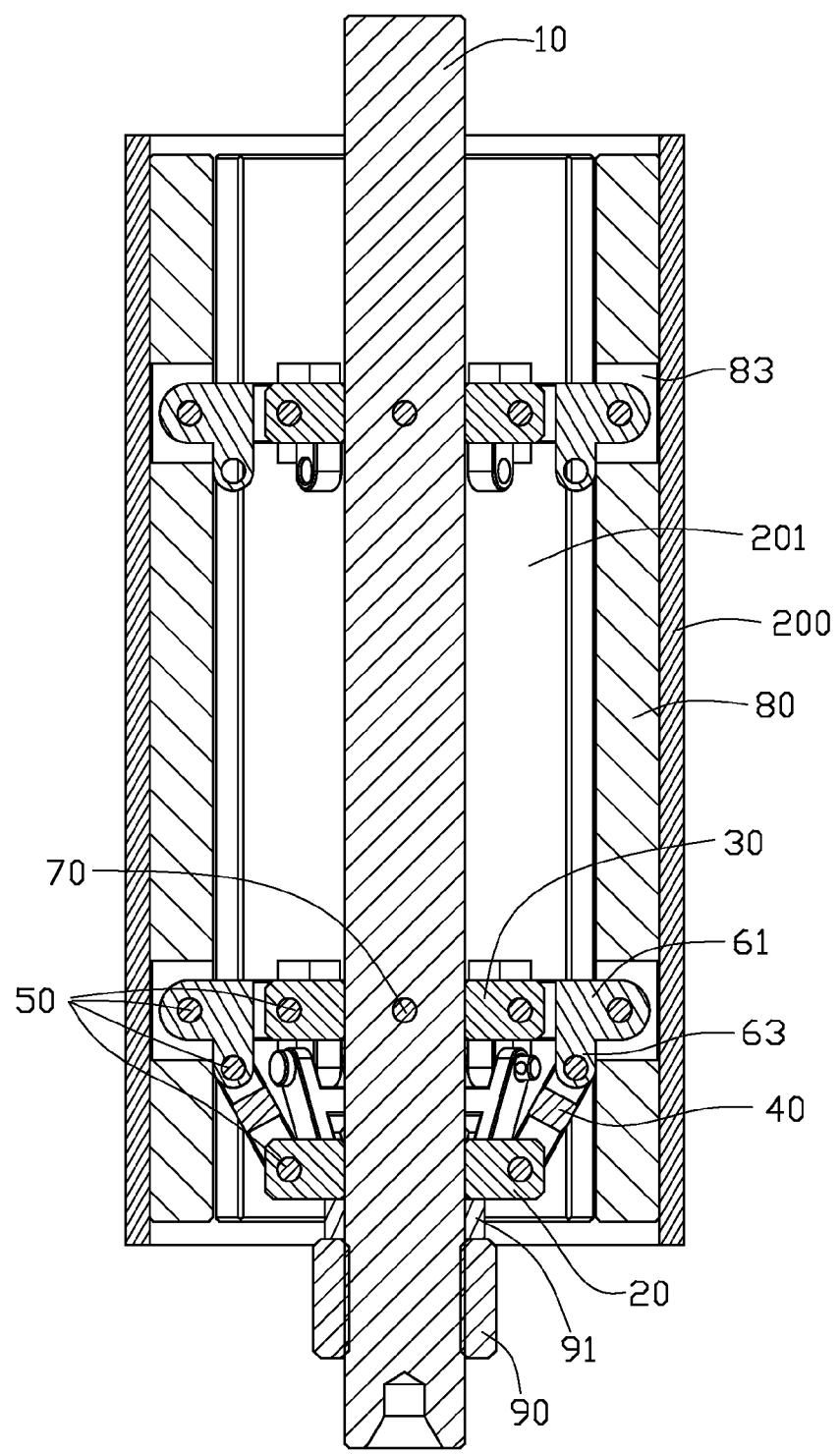
FIG. 5 is a cross-sectional view of the clamping apparatus of FIG. 1 with the workpiece.

FIGS. 1 and 4-5 illustrate that the clamping apparatus 100 can be inserted into the through hole 201 of the workpiece 200 and received in the through hole 201. The nut 90 can be driven to move along the main shaft 10 towards the follow member 20, to enable the elastic member 91 to push the follow member 20 towards the coupling member 30. Because the first linkages 40 and the second linkages 60 constitute a link mechanism, the first linkages 40 can push the corresponding second linkages 60 to rotate around a center axis of the corresponding pivoting hole 331. Thus, the second linkages 60 can drive the pushing members 80 to move parallel to the main shaft 10 and move away from the main shaft 10 so that the pushing members 80 push against an inner side surface of the workpiece 200 to clamp and hold the workpiece 200 in place. In the illustrated embodiment, the first pivoting portion 61 of each second linkage 60 and the pivoting portion 33 of the corresponding coupling member 30 can be in a straight line. Thus, the pushing members 80 can be in a maximum expansion status (shown in FIG. 5). When the nut 90 is driven to move away from the follow member 20, the workpiece 200 can be released.

In at least one embodiment, the outer surface 80 of the pushing member 80 can include one or more opening 83. More than one coupling member 30 can be used. The elastic member 91 can be omitted and then the nut 90 can directly push the follow member when in use.

The embodiments shown and described above are only examples. Many details are often found in the art such as the other features of a clamping apparatus. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A clamping apparatus comprising:
a main shaft;
at least two pushing members;
a follow member movably sleeved on the main shaft;
a coupling member fixedly sleeved on the main shaft;
at least two first linkages respectively pivoted to the follow member;
at least two second linkages, each of the at least two second linkage pivoted to the corresponding first linkage, the coupling member, and the corresponding pushing member; and
a nut movably sleeved on the main shaft and positioned at a side of the follow member away from the coupling member, the nut configured to move the follow member towards the coupling member, to enable the at least two pushing members to move away from the main shaft.

2. The clamping apparatus of claim 1, wherein the at least two second linkages are symmetrically positioned at opposite sides of the main shaft, the at least two pushing members are symmetrically positioned at opposite sides of the main shaft.

3. The clamping apparatus of claim 1, wherein the main shaft defines:
a pair of limiting grooves at an outer side surface thereof and symmetrical relative to a center axis of the main shaft, and
a fixing hole respectively running through the main shaft along a radial direction of the main shaft and communicating with the pair of limiting grooves,
wherein, the coupling member defines a coupling hole along a radial direction thereof, the coupling member is fixed to the main shaft via a coupling pin inserted into the fixing hole and the coupling hole.

4. The clamping apparatus of claim 1, wherein the coupling member comprises a mounting portion and at least two pivoting portions symmetrically coupled to the mounting portion, the at least two pivoting portions are respectively pivoted to the at least two second linkages.

5. The clamping apparatus of claim 4, wherein each second linkage comprises a first pivoting portion and a second pivoting portion extending from a substantially middle portion of the first pivoting portion, the first pivoting portion is pivoted to the corresponding pivoting portion of the coupling member and the corresponding pushing member, the second pivoting portion is pivoted to the corresponding first linkage.

6. The clamping apparatus of claim 5, wherein each pushing member defines an opening and a pair of positioning holes communicating with the opening, each pushing member is pivoted to the corresponding second linkage via a pivoting pin inserted into the pair of positioning holes and the corresponding second linkage.

7. The clamping apparatus of claim 1, wherein the follow member comprises a mounting portion and at least two pivoting portions symmetrically coupled to the mounting portion, the at least two pivoting portions are respectively pivoted to the at least two first linkages.

8. The clamping apparatus of claim 7, wherein each first linkage is substantially H-shaped, opposite end portions of each first linkage are respectively pivoted to the corresponding second linkage and the corresponding pivoting portion of the follow member via a pivoting pin.

9. The clamping apparatus of claim 1 further comprising:
an elastic member movably sleeved on the main shaft and positioned between the nut and the follow member.

10. The clamping apparatus of claim 1, wherein each pushing member comprises an outer surface of substantially a cylindrical surface.

11. A clamping apparatus comprising:
a main shaft;
two pushing members;
a follow member movably sleeved on the main shaft;
two coupling members fixedly sleeved on the main shaft;
two first linkages respectively pivoted to the follow member;
four second linkages, two of the four second linkages respectively pivoted to the first linkages, the coupling member adjacent to the follow member, and the pushing members, another two of the four second linkages respectively pivoted to the coupling member away from the follow member and the pushing members; and
a nut movably sleeved on the main shaft and positioned at a side of the follow member away from the coupling members, the nut configured to move the follow member towards the adjacent coupling member, to enable the at least two pushing members to move away from the main shaft.

12. The clamping apparatus of claim 11, wherein the pushing members are symmetrically positioned at opposite sides of the main shaft.

13. The clamping apparatus of claim 11, wherein the main shaft defines:

two pairs of limiting grooves at an outer side surface thereof, and two fixing hole respectively running through the main shaft along a radial direction of the main shaft and respectively communicating with the pairs of limiting grooves, wherein, each coupling member defines a coupling hole along a radial direction thereof, each coupling member is fixed to the main shaft via a coupling pin inserted into the corresponding fixing hole and the coupling hole.

14. The clamping apparatus of claim 11, wherein each coupling member comprises a mounting portion and at least two pivoting portions symmetrically coupled to the mounting portion, the at least two pivoting portions are respectively pivoted to the corresponding second linkages.

15. The clamping apparatus of claim 14, wherein each second linkage comprises a first pivoting portion and a second pivoting portion extending from a substantially middle portion of the first pivoting portion, opposite end portions of the first pivoting portion are respectively pivoted to the corresponding pivoting portion of the coupling member and the corresponding pushing member, the second pivoting portions of the two second linkages are respectively pivoted to the corresponding first linkage.

16. The clamping apparatus of claim 15, wherein each pushing member defines two opening and two pair of positioning holes communicating with the corresponding opening, each pushing member is pivoted to the corresponding second linkages via pivoting pins respectively inserted into the corresponding pair of positioning holes and the corresponding second linkage.

17. The clamping apparatus of claim 11, wherein the follow member comprises a mounting portion and at least two pivoting portions symmetrically coupled to the mounting portion, the at least two pivoting portions are respectively pivoted to the first linkages.

18. The clamping apparatus of claim 17, wherein each first linkage is substantially H-shaped, opposite end portions of each first linkage are respectively pivoted to the corresponding second linkage and the corresponding pivoting portion of the follow member via a pivoting pin.

19. The clamping apparatus of claim 11 further comprising:
an elastic member movably sleeved on the main shaft and positioned between the nut and the follow member.

20. The clamping apparatus of claim 11, wherein each pushing member comprises an outer surface of substantially a cylindrical surface.

* * * * *